No. 684,329. Patented Oct. 8, 1901.
J. S. WEBB.
APPARATUS FOR BRAZING.
(Application filed Apr. 28, 1900.)
(No Model.) 2 Sheets—Sheet 1.
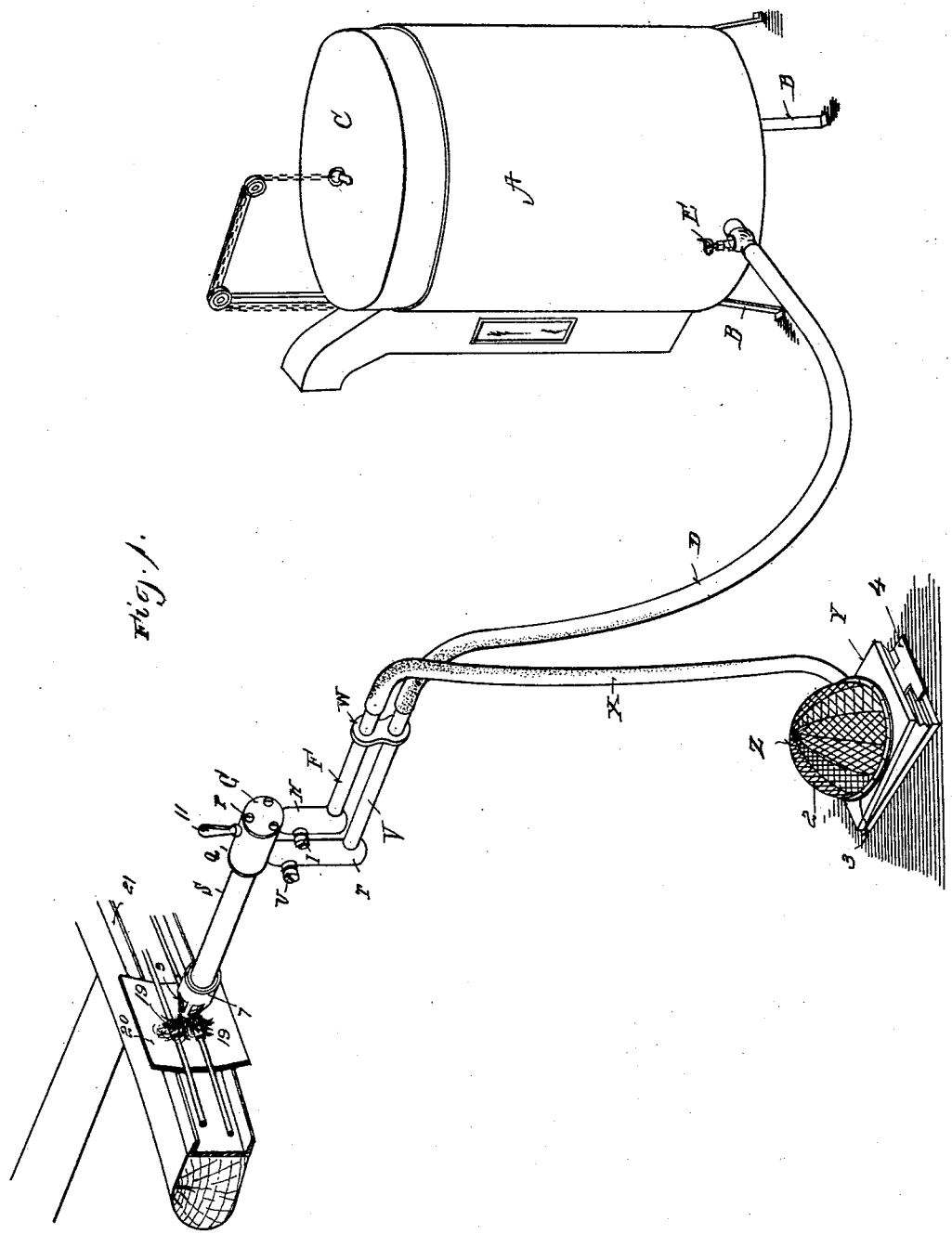
Witnesses
Jas. C. Dawley
H. M. McNair
Inventor
James S. Webb
By his Attorney
H. A. Toulmin.

No. 684,329. Patented Oct. 8, 1901.
J. S. WEBB.
APPARATUS FOR BRAZING.
(Application filed Apr. 28, 1900.)
(No Model.) 2 Sheets—Sheet 2.
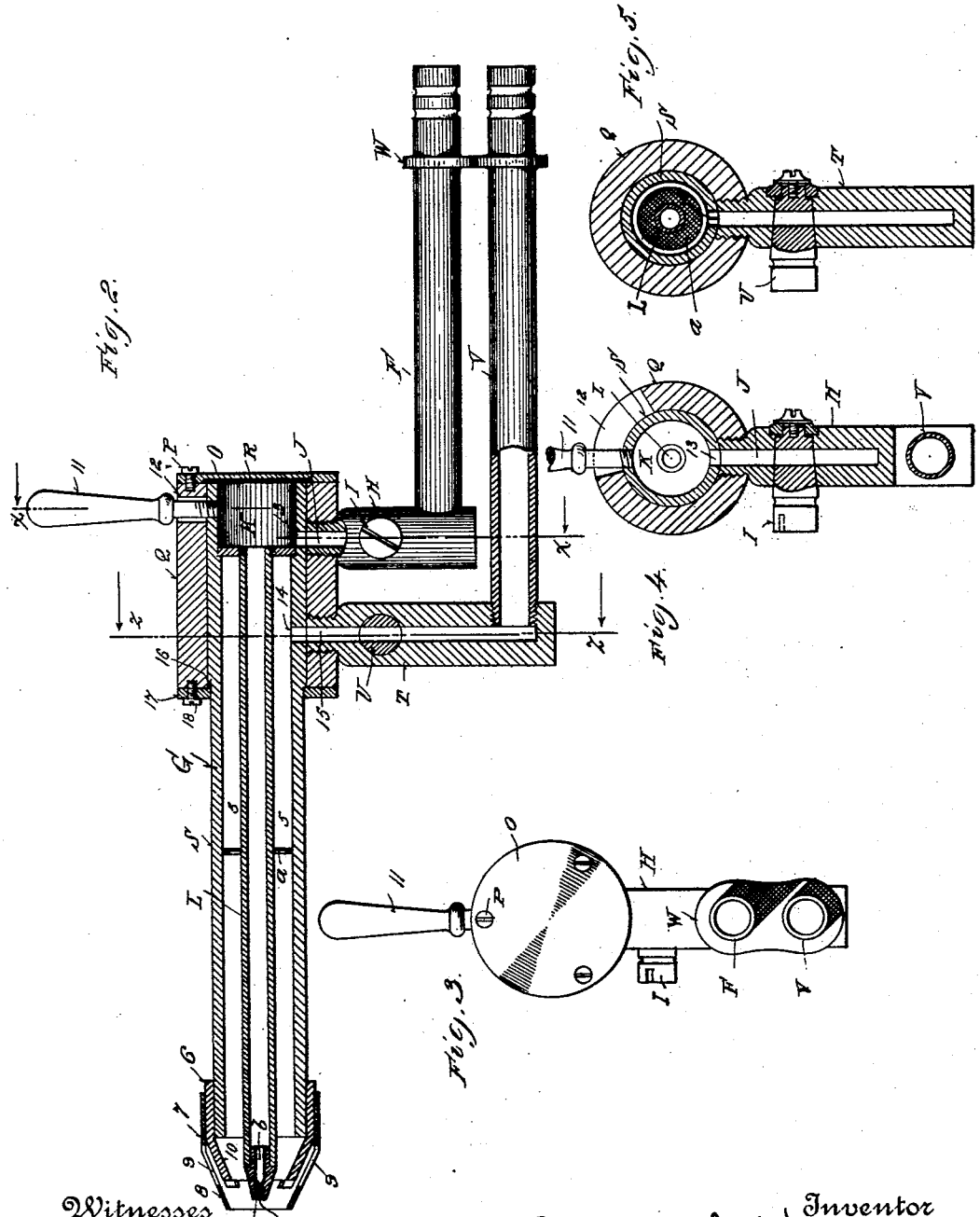

UNITED STATES PATENT OFFICE.

JAMES S. WEBB, OF NEW YORK, N. Y., ASSIGNOR, BY MESNE ASSIGNMENTS, TO THE VICTOR RUBBER COMPANY, OF SPRINGFIELD, OHIO.

APPARATUS FOR BRAZING.

SPECIFICATION forming part of Letters Patent No. 684,329, dated October 8, 1901.

Application filed April 28, 1900. Serial No. 14,671. (No model.)

*To all whom it may concern:*

Be it known that I, JAMES S. WEBB, a citizen of the United States, residing at New York, in the county of New York and State of New York, have invented certain new and useful Improvements in Apparatus for Brazing, of which the following is a specification, reference being had therein to the accompanying drawings.

This invention relates to certain new and useful improvements in apparatus for producing a flame from acetylene or volatile mixtures suitable for brazing purposes, and is particularly adapted for use in connection with brazing the ends of wires commonly employed for retaining rubber tires within their channel-iron seats.

The general object of my invention is to provide a device which will correctly proportion the air and acetylene so as to produce perfect combustion and also an intensity of flame sufficient for brazing purposes.

My invention also relates to means for producing a continuous air-blast, whereby the flame is kept steady and even.

My invention also relates to a device for controlling the length of flame and also the size of flame without varying the passage for the acetylene and air.

My invention also relates to details of construction and arrangement hereinafter appearing and particularly pointed out in the claims.

In the accompanying drawings, on which like reference characters indicate corresponding parts, Figure 1 represents a perspective view of an ordinary acetylene-gas generator with my apparatus connected therewith and showing the manner in which the flame is brought to bear upon the ends of retaining wires or bands used in connection with vehicle-tires, such wires being shown in section within a channel-iron mounted on a vehicle-wheel, such channel-iron and felly also being in section. Fig. 2 is a longitudinal sectional view through the air and acetylene mixer and also showing a portion of the air-conduit in section, the remaining portion of the air-conduit and gas-inlet conduit being in full lines; Fig. 3, a rear end elevation of my improved air and gas mixer; Fig. 4, a sectional view on the line *x x* of Fig. 2 looking in the direction of the arrows, and Fig. 5 a sectional view on the line *z z* of Fig. 2 looking in the direction of the arrows.

This invention is designed particularly for doing away with electric welding as applied to retaining devices for holding rubber tires within channel-irons placed upon vehicle-wheels, as such electric welding softens the joint welded, so that it will elongate more or less, and thereby lessen the tension of the retaining wires or devices, and not only this, but the ends of the wires readily separate by reason of the sharp blows to which they are subjected in use, so that the retaining-wires may be separated at points where they have been electrically welded should severe blows and shocks be brought to bear upon the rubber immediately over the weld. All this I overcome with my apparatus and am enabled to quickly and permanently unite the ends of retaining means for vehicle-wheels particularly, although my apparatus may be used for other purposes if desired.

In Fig. 1 I have illustrated an ordinary acetylene tank and generator consisting of a body portion A, mounted on legs B and having a sliding head C, adapted to slide up and down in the body portion and act to press the gas out through a tube D. A stop-cock E is mounted adjacent to the gas generator and holder to shut off the gas entirely from the rubber tube or hose D when desired. The outer end of such tube is connected with a tube V, communicating with my mixing device G. A nipple T screws directly into the mixer, as clearly shown in Fig. 2, the tube V being screwed into such nipple near its outer end. Within the nipple is mounted a cut-off cock U, which shuts off the gas more or less or entirely from the mixer. It will be seen that the passage 15 in the nipple T communicates directly with the annular passage 5 in the mixer, while the passage J in the nipple H communicates directly with the chamber K. A central tube L in the mixer communicates directly with said chamber K for conducting the air through such passage and also through a nozzle M, mounted on the outer end of said tube L. Access may be had to the chamber by removing a cap O after first unscrewing screws P, which screw through the cap and into the casing Q on the mixer proper. In order to make a perfectly-tight joint, a suitable packing, such as shown at R, is fitted between the end of the barrel S of the mixer and the cap O, so that as such cap is screwed in place it binds snugly against the packing and prevents the escape of air at the rear end of such mixer. The nipple H has a regulating-valve I therein similar to the valve U, above described. To the nipple H is secured an air pipe or tube F, which preferably extends parallel to the tube V and is held from separating from said tube by means of a holding-plate W, as shown in Figs. 1 and 2. A rubber tube X is connected to the outer end of the tube F and also with an air-pressure-creating device consisting of a bellows Y, upon which is mounted an elastic diaphragm Z, preferably composed of rubber and mounted in a retainer-casing 2, tacked to the upper portion of the bellows Y, as shown at 3. A footpiece 4 extends outward from the upper side of the bellows, as shown in Fig. 1. The foot of the operator may be placed upon the footpiece 4 for operating the bellows. Such operation of the bellows causes the diaphragm Z to expand and fill the casing 2, and the diaphragm being elastic it operates on the air to constantly expel it through the rubber tube X, tube F, nipple H, chamber K, and the central tube L in the mixer. Upon the outer end of the barrel S is mounted a reducing-thimble 6, which tapers inward toward its center end, so as to direct the acetylene as it travels through the passage 5 into contact with the air passing through the nozzle M, such nozzle extending a slight distance beyond the outer end of the reducer 6. In order that an additional amount of air may be mixed with the air and gas, so as to vary the size of the flame and its intensity and also to check the flow of acetylene, I provide an adjustable thimble 7, which is mounted on the reducer 6. Such thimble tapers from about midway its length to its outer end in a manner similar to the reducer 6, as shown at 8. In the tapered portion of said thimble, as well as in a portion of the cylindrical body of said thimble, a number of holes or openings 9 are provided. By sliding this thimble out or in on the reducer 6 more or less air is permitted to pass through the openings 9 and between the tapered portion of the reducer and the tapered portion of the thimble and is directed into contact with the flame. The air as it leaves the nozzle M is instantly mixed with the acetylene under pressure passing through the annular passage 5, so that the flame is greatly intensified, such flame also drawing in a supply of air through the holes or openings 9 in the thimble. This supply of air is given such force and is so directed against the flame as to act to retard the gas in the annular gas-passage 5. By sliding the thimble out upon the reducer 6 so as to increase the space between the tapering portion 10 of the reducer and the tapering portion 8 of the thimble an enlarged quantity of air is drawn through the passages or holes 9, and the flame is consequently shortened and also decreased in size in cross-section, although much intensified by reason of being supplied with a greater quantity of oxygen. Should the tapered portion of the thimble be pushed snugly up against the tapered portion of the reducer, no air, or at least a very small quantity, will be drawn through the holes or openings 9. This permits the flame to elongate very materially as also spread out over a greater area and at the same time reduces the intensity of the flame at any one point. By actual experience it is found to make very little difference with respect to the intensity of the flame how much air may be forced through the tube L, so long as the proper proportion of air and acetylene pass into the mixer. Such proportion of air and acetylene is regulated by means of the cocks I and U, respectively, which are adapted to permit much or little gas or air to pass through the central tube L and annular passage 5, as desired. Thus with my invention I am enabled to control the mixture of acetylene and air to a nicety by turning the cocks I and U more or less. As soon as the proper mixture is obtained the respective cocks remain in their adjusted positions, while to vary the intensity of the flame and also the size of the flame I manipulate the thimble 7 out or in on the reducer 6. In order that the acetylene and air may be shut off from the barrel S, it will be observed that I have provided a handle 11, which screws into the barrel S through a slotted opening 12 in the casing Q. The barrel S has a passage 13, which is adapted to register with the passage J in the nipple H, such barrel also having a similar hole or opening 14, leading from the passage 15 in the nipple T to the annular passage 5. When the handle 11 is in the position indicated in Figs. 3 and 4, the holes 13 and 14 register with the passages in the nipples H and T, respectively; but when it is desired to cut off the flow of acetylene and compressed air the handle 11 is moved down to the lower end of the slot 12, which acts to rotate the barrel S and swing the openings 13 and 14 away from the respective passages J and 15. In order that the barrel may be held within the casing S, it will be observed that such barrel is shouldered, as shown at 16. An annular ring 17 fits against the shoulder 16 and also against the end of the casing Q, in which position it is held by one or more screws 18, which extend through the ring 17 and into the end of the casing Q.

Let it be supposed that the handle 11 is swung to the position so that the holes 13 and 14 may communicate with their respective passages J and 15 and that air and gas are passing through their respective passages to the outer end of the mixer, where they unite. A match is applied to the mixture, thereby instantly producing a flame, such flame being regulated by the thimble 7 in the manner above described. Let it be supposed that the wires constituting the retaining means for a vehicle rubber tire (not shown) are brought together in the manner indicated in Fig. 1, with a ferrule 19 fitting over the meeting ends of each of such retaining means, and that the proper brazing material has been placed within the ferrule around the ends of the retaining-wires. A piece of sheet metal 20 is slipped between the wires and the channel-iron 21, as indicated in Fig. 1, to prevent the paint and varnish on said channel-iron from becoming cracked or burned. The flame is directed upon one of the ferrules 19, which quickly glows with a brazing heat, so that the ends of the wires are firmly united. The flame is then directed against the second ferrule, which in turn becomes quickly heated to the brazing-point.

It will be noted that after the proper proportions of gas and air are once established by the proper adjustment of the valves I and U these valves need not be in any way disturbed when it is desired to vary the total amount of the predetermined mixture supplied at the mouth of the implement or to entirely cut off or reëstablish the supply, since these results are accomplished entirely by the turning of the barrel S through the medium of the handle 11. Thus after the desired proportions are once established the flame may be turned up or down or lighted or extinguished without requiring the readjustment of the valves which control the proportions of air and gas after each one of these operations.

Of course it will be understood that in applying rubber tires to vehicle-wheels it is desired to hold the rubber in the channel-iron so firmly that there will be no chance of its rolling out when the vehicle turns sharp corners, &c. In order to accomplish this, it has been found necessary to braze the retaining-wires after they are passed through the rubber tire (not shown) and after such tire is placed within the channel-iron. It is for this reason that it was found necessary to produce an apparatus which was sufficiently portable to be used wherever desired and which was also sufficiently flexible to permit of directing the flame against the meeting ends of the wires within the channel-iron. With my construction I am enabled to accomplish this result in an economical and practical manner, so that tires may be readily applied by any dealer without the necessity of an expensive plant for such purpose.

In order to prevent any possibility of the flame following back into the gasolene-tank, I provide a wire-gauze screen or reticulated body $a$ in the gas-passage 5 or other suitable position between the supply-tank and the burner. This screen may or may not be used, as desired; but where it is used the factor of safety is greatly increased.

Referring again to the nozzle M, it will be seen that the passage therein is enlarged at the rear, as shown at $b$, while its outer portion, as shown at $c$, is smaller. This formation of passage keeps the length of flame comparatively short, yet at the same time greatly intensifies it.

Having thus fully described my invention, what I claim as new, and desire to secure by Letters Patent, is—

1. In an apparatus for brazing, the combination with a casing, of a barrel mounted therein, means for conducting air to said barrel and means for conducting gas to said barrel, said barrel having a gas-passage therein into which said gas passes and an air-passage in said barrel into which said air passes, a reducer mounted on the outer end of said barrel and adapted to direct the gas issuing from said gas-passage into the air as it leaves said air-passage, a thimble mounted on said reducer having holes or openings therein, and means for regulating the gas and air entering said barrel, substantially as shown and described.

2. In an apparatus for brazing, the combination, with a casing having a gas-inlet passage and an air-inlet passage, of independent valves controlling said passages for the purpose of regulating the relative proportions of air and gas, means for supplying gas and air under pressure to said gas and air inlet passages respectively, and a barrel rotatably mounted in said casing and provided with a gas-passage and an air-passage having inlet-apertures which may be brought into or out of register with the respective passages of the casing by the rotation of the barrel, whereby the relative proportions of gas and air and the amount of the mixture issuing from the barrel may be controlled independently of each other, substantially as described.

3. In an apparatus for brazing, the combination with a barrel having a gas-passage and an air-passage therein, means for conducting air and gas into said respective passages, a reducer mounted on the outer end of said barrel, and a thimble having holes or openings therein slidably mounted on said reducer, substantially as shown and described.

4. In an apparatus for brazing, the combination with a casing having a slotted opening therein and also a barrel-receiving opening, a barrel adapted to project within said barrel-receiving opening, said barrel having a shoulder thereon, an end cap secured to said casing and fitting over one end of said barrel, an annular ring secured to the other end of said casing and fitting against said shoulder on the barrel, a handle projecting through said slotted opening into said barrel and adapted to partially rotate such barrel, gas and air inlet openings through said barrel adapted to communicate with their respective gas and air passages in said casing when said handle is in one position and be out of communication with said passages when said handle is in another position, substantially as shown and described.

5. In an apparatus for brazing, the combination with a barrel having a gas-passage and an air-passage therein, of a reducer mounted on the outer end of said barrel and a nozzle mounted at the outer end of said air-passage, said reducer directing the gas in said gas-passage into contact with the air issuing from said air-passage, and a thimble adjustable on said reducer, said thimble having holes or openings therein through which an additional amount of air enters for controlling the exit of gas, said holes or openings being more or less closed by the adjustment of said thimble on said reducer, substantially as shown and described.

6. In an apparatus for brazing, the combination with a casing having a gas-passage and an air-passage therein, a reducer connected with said gas-passage for reducing the quantity of gas passing therethrough, a thimble mounted on said reducer and leaving a passage for air between them, and means for regulating the amount of air entering said passage, all substantially as shown and described.

In testimony whereof I affix my signature in presence of two witnesses.

JAMES S. WEBB.

Witnesses:
SILAS L. HAZEN,
EDWARD HEARN.